(12) United States Patent
Lee et al.

(10) Patent No.: US 7,565,956 B2
(45) Date of Patent: Jul. 28, 2009

(54) SHOCK ABSORBER WITH A DAMPING DEVICE

(76) Inventors: Chung-Chia Lee, No. 40, Linhai Rd., Cingshuei Chen, Taichung Hsien (TW); Chung-Che Lee, No. 40, Linhai Rd., Cingshuei Chen, Taichung Hsien (TW)

( * ) Notice: Subject to any disclaimer, the term of this patent is extended or adjusted under 35 U.S.C. 154(b) by 398 days.

(21) Appl. No.: 11/492,592

(22) Filed: Jul. 25, 2006

(65) Prior Publication Data
US 2008/0023279 A1    Jan. 31, 2008

(51) Int. Cl.
*F16F 9/50* (2006.01)
(52) U.S. Cl. .................. 188/282.7; 188/282.9; 188/288; 188/322.15; 188/319.1
(58) Field of Classification Search .................. 188/288, 188/297, 280, 281, 282.1, 282.7, 282.8, 322.13, 188/322.15, 322.22, 317, 319.1, 319.2; 267/64.26
See application file for complete search history.

(56) References Cited

U.S. PATENT DOCUMENTS 3,272,495 A * 9/1966 Axthammer ................ 188/315
3,447,644 A * 6/1969 Duckett ...................... 188/288

FOREIGN PATENT DOCUMENTS

JP    59093538 A  *  5/1984

\* cited by examiner

*Primary Examiner*—Thomas J Williams
(74) *Attorney, Agent, or Firm*—William E. Pelton, Esq.; Cooper & Dunham LLP

(57) ABSTRACT

A shock absorber has an outer tube, an inner tub, a piston rod, a piston and a damping device. The inner tube is slidably inserted into the outer tube and has an inner space with an inner diameter. The piston is securely mounted on the piston rod, is slidably held inside the inner tube to divide the inner space of the inner tube into two segments and has at least one channel. The damping device has a plug and a sleeve. The plug is securely attached to the piston and has a diameter. The sleeve is securely mounted in the inner tube and has an inner diameter. The diameter of the plug is smaller than the inner diameters of the inner tube and the sleeve. The inner diameter of the sleeve is smaller than that of the inner tube.

2 Claims, 4 Drawing Sheets

SHOCK ABSORBER WITH A DAMPING DEVICE

BACKGROUND OF THE INVENTION

1. Field of the Invention

The present invention relates to a shock absorber, and more particularly to a hydraulic shock absorber having a damping device to provide an excellent shock-absorbing effect by means of changing the flow rate of oil.

2. Description of Related Art

To improve comfort of driving or riding a vehicle such as a car, motorcycle or a bicycle and to keep shock from being transmitting to the vehicle to cause damage to the vehicle, shock absorbers are always mounted between a frame and wheels of the vehicle. A conventional shock absorber in accordance with the prior art substantially comprises an outer tube, an inner tube slidably combined with the outer tube and a shock-absorbing element. The shock-absorbing element is mounted between the inner tube and the outer tube and may be a spring or oil. A shock absorbing effect is achieved due to the compression of the spring or the flow of the oil inside the tubes.

However, when the shock applied to the wheel is huge, the travel of the inner tube relative to the outer tube is so long to cause the inner tube bump directly against the outer tube. This will cause the shock absorbing effect of the absorber to be eliminated and damage to the absorber and the vehicle. In addition, a resilient bumper is mounted between the inner tube and outer tube to keep the tubes from contacting with each other directly. However, the bumper is easily damaged after a period of use due to exhaustion of resilience.

To overcome the shortcomings, the present invention tends to provide a shock absorber to mitigate or obviate the aforementioned problems.

SUMMARY OF THE INVENTION

The main objective of the invention is to provide a hydraulic shock absorber having a damping device to provide an excellent shock-absorbing effect by means of changing the flow rate of oil. The shock absorber has an outer tube, an inner tub, a piston rod, a piston and a damping device. The outer tube has a closed end and an open end. The inner tube is slidably inserted into the open end of the outer tube and has an inner surface and an inner space with an inner diameter. The piston rod has a first end securely attached to the closed end of the outer tube and a second end extending into the inner tube. The piston is securely mounted on the second end of the piston rod, is slidably held inside the inner tube to divide the inner space of the inner tube into two segments and has at least one channel defined through the piston and communicating with the segments of the inner space of the inner tube. The damping device has a plug and a sleeve. The plug is securely attached to the piston and has a diameter. The sleeve is securely mounted in the inner tube and has an inner diameter. The diameter of the plug is smaller than the inner diameters of the inner space of the inner tube and the sleeve. The inner diameter of the sleeve is smaller than that of the inner space of the inner tube.

Other objects, advantages and novel features of the invention will become more apparent from the following detailed description when taken in conjunction with the accompanying drawings.

DETAILED DESCRIPTION OF PREFERRED EMBODIMENT

Figure 1:
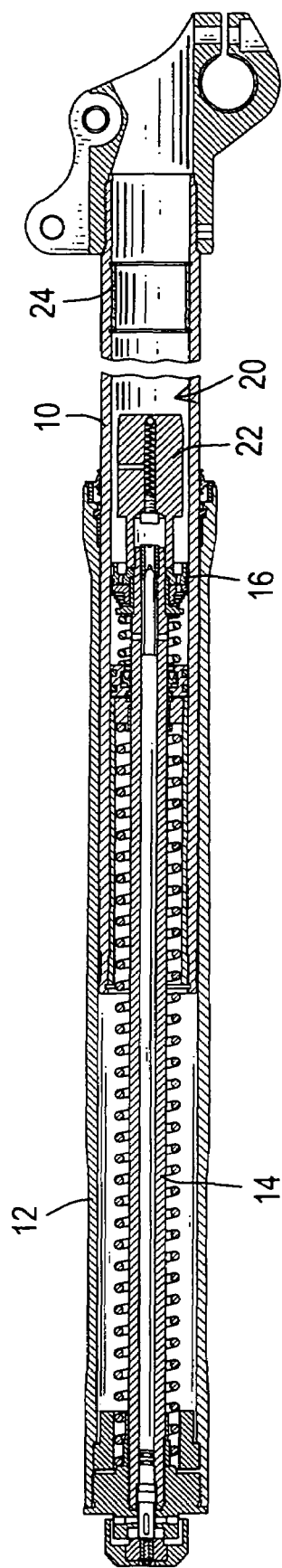
FIG. 1 is a side plane view in partial section of a shock absorber in accordance with the present invention.
Figure 2:
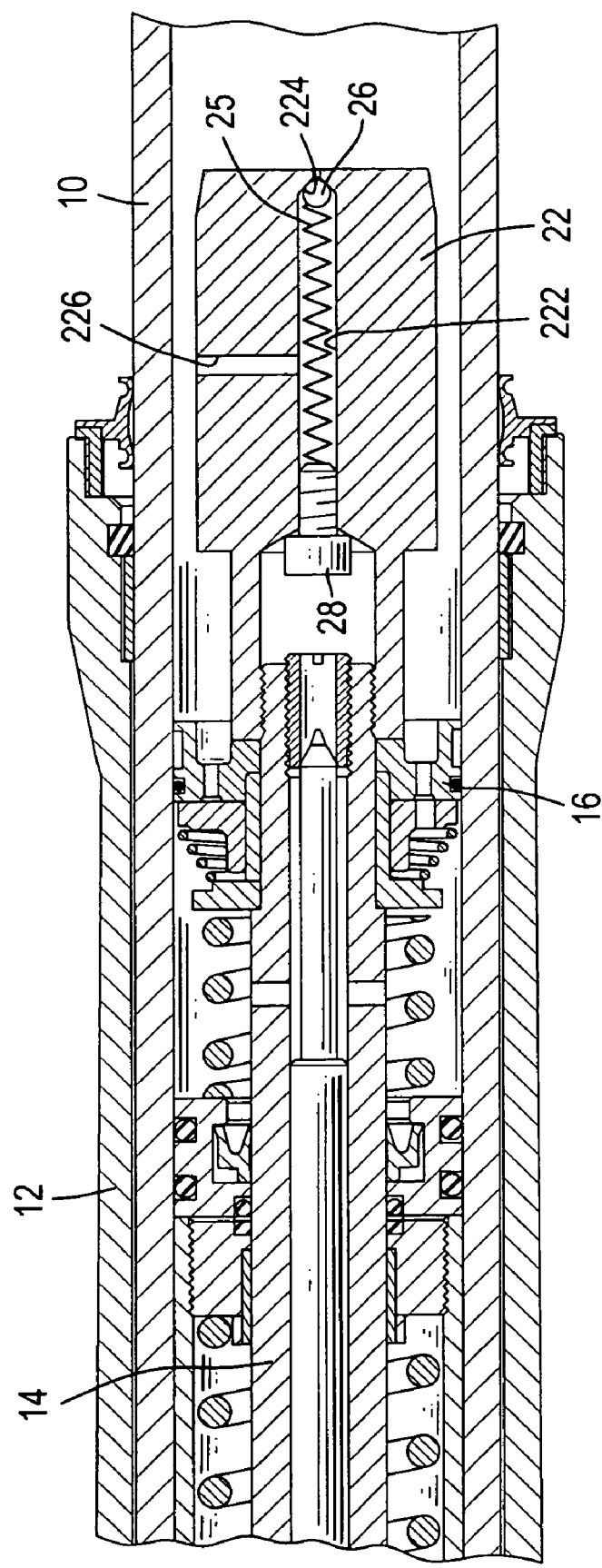
FIG. 2 is an enlarged side plane view in partial section of the shock absorber in FIG. 1.

With reference to FIGS. 1 and 2, a shock absorber in accordance with the present invention comprises an outer tube (12), an inner tube (10), a piston rod (14), a piston (16) and a damping device (20). The outer tube (12) is adapted to be connected to a frame of a vehicle and has a closed end and an open end. The inner tube (10) is adapted to be connected to a wheel of the vehicle and is slidably inserted into the open end of the outer tube (12). The inner tube (10) has an inner surface and an inner space with an inner diameter. The piston rod (14) has a first end securely attached to the closed end of the outer tube (12) and a second end extending into the inner tube (10). The piston (16) is securely mounted on the second end of the piston rod (14) and is slidably held inside the inner tube (10) to divide the inner space of the inner tube (10) into two segments. Oil is contained in both segments of the inner space of the inner tube (10). The piston (16) has at least one channel defined through the piston (16) and communicating with the segments of the inner space of the inner tube (10). When an external force is applied to the wheel to generate a shock, the inner tube (10) will slide relative to the outer tube (12) and the piston (16) will move along the inner tube (10). Consequently, the oil in the compressed segment of the inner space of the inner tube (10) will flow to the other segment through the channels in the piston (16) and the pressure in the compressed segment is increased. Accordingly, a shock-absorbing effect is provided with the increase of the pressure of the oil. In addition, a spring is mounted around the piston rod (14) to provide an improved shock-absorbing effect.

The damping device (20) comprises a plug (22) and a sleeve (24). The plug (22) is securely attached to the piston (16) and has a diameter. The sleeve (24) is securely mounted in the inner tube (10) and has an inner diameter. The diameter of the plug (22) is smaller than the inner diameters of the inner space of the inner tube (10) and the sleeve (24). Accordingly, a first flow channel is defined between the plug (22) and the inner surface of the inner tube (10), and a second flow channel is defined between the plug (22) and the sleeve (24) when the plug (22) enters into the sleeve (24). The inner diameter of the sleeve (24) is smaller than that of the inner space of the inner tube (10), such that the second flow channel has a width smaller than that of the first flow channel.

In addition, the inner tube (10) has multiple annular positioning grooves separately defined in the inner surface of the inner tube (10). The sleeve (24) is securely mounted between two of the grooves in the inner tube (10) with two fasteners mounted respectively in the grooves. Accordingly, the sleeve (24) can be held in the inner tube (10) at different locations based on the positioning grooves.

Figure 3:
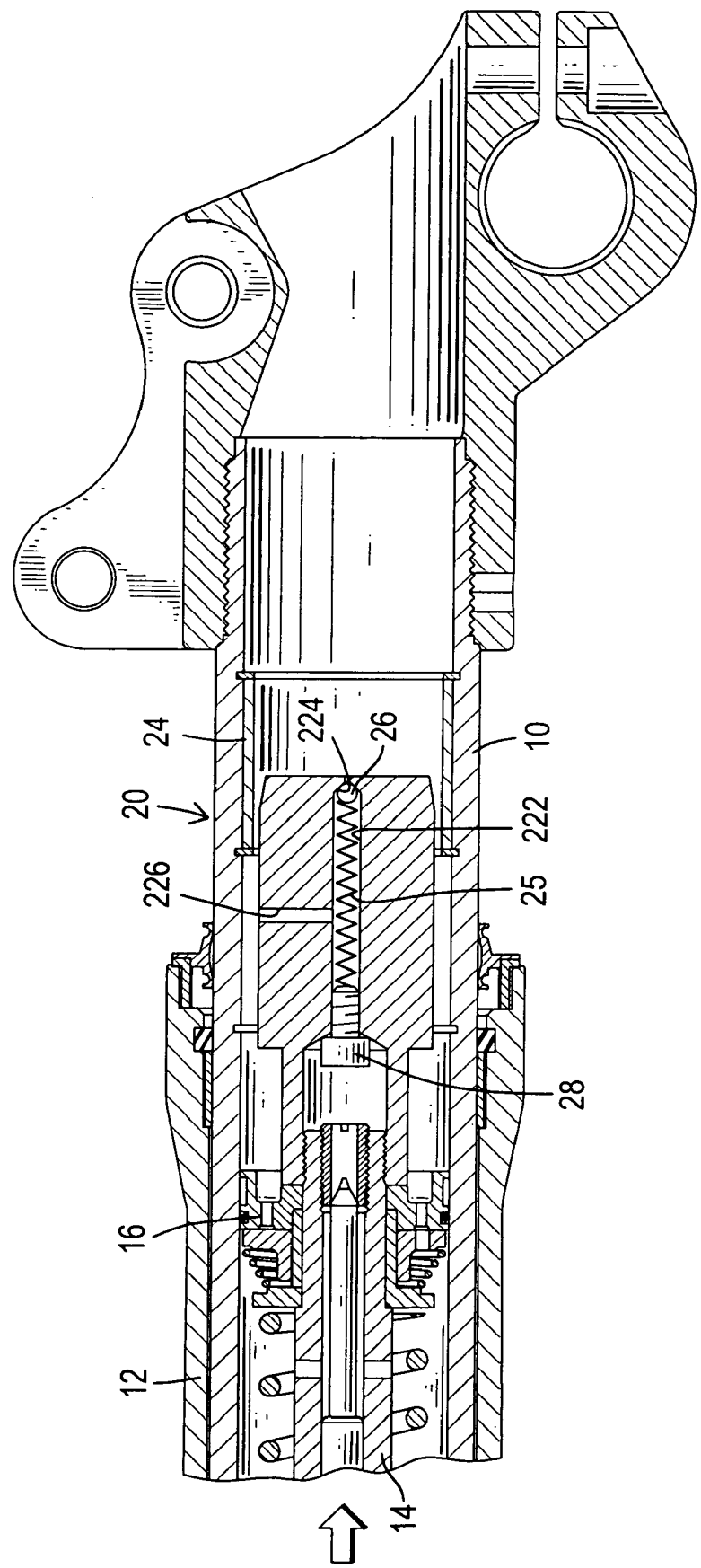
FIG. 3 is an enlarged operational side plane view in partial section of the shock absorber in FIG. 1.
Figure 4:
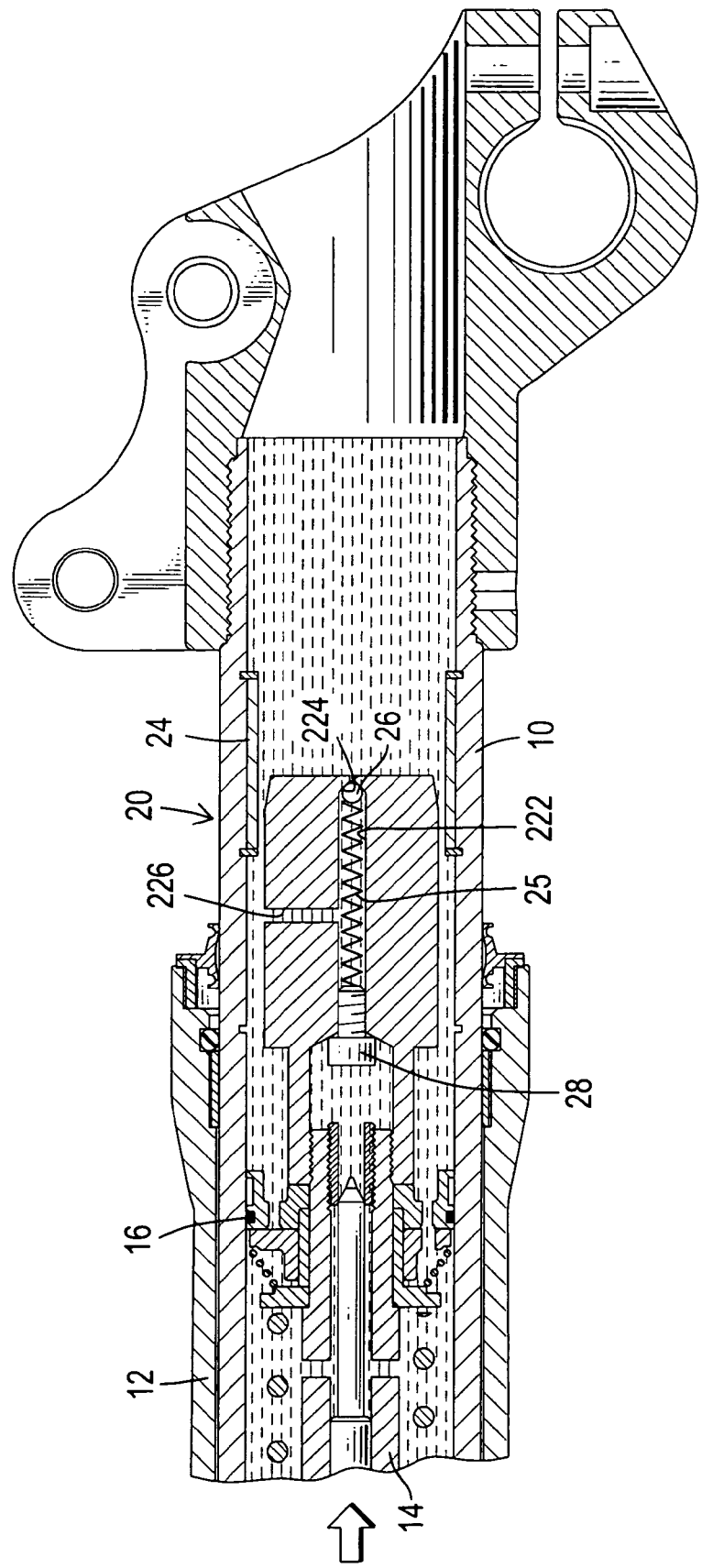
FIG. 4 is an enlarged operational side plane view in partial section of the shock absorber in FIG. 1 with oil inside.

In operation, with further reference to FIGS. 3 and 4, when the inner tube (10) moves relative to the outer tube (12), the oil in the compressed segment of the inner space of the inner tube (10) will flow toward the piston (16) through the first flow channel. When the plug (22) enters into the sleeve (24), the second flow channel is defined between the plug (22) and sleeve (24). Because the width of the second flow channel is smaller than that of the first flow channel, the area for oil flow is decreased and the flow rate of the oil is reduced. Accordingly, the speed of the movement of the plug (22) with the piston (16) will be reduced, and oil pressure in the compressed segment applied to the piston (16) is increased. Therefore, the plug (22) can be effectively kept from bumping against the inner tube (10), and the shock absorbing effect of the absorber is improved. In addition, without directly contact between the plug (22) and the inner tube (10), the piston rod (14), the piston (16) and the plug (22) are not easily damaged, so that the useful life of the shock absorber is prolonged.

Additionally, when the location of the sleeve (24) in the inner tube (10) is changed, the time and location of the plug (22) entering into the sleeve (24) will be changed so as to provide different shock absorbing effects. Thus, the shock absorber in accordance with the present invention is versatile in use.

Furthermore, the plug (22) comprises a pressure-adjusting valve mounted in the plug (22), and the pressure-adjusting valve comprises an adjusting channel (222), a sealing member (26), a biasing member (25), an adjusting bolt (28) and a branch channel (26). The adjusting channel (222) is defined axially through the plug (22) and has an inner diameter and a tapered segment (224) defined at an end of the adjusting channel (222) opposite to the piston (16) and having an inner diameter. The sealing member (26) is movably mounted in the adjusting channel (222) to close the tapered segment (224) of the adjusting channel (222) and may be a ball. The sealing member (26) has a diameter smaller than the inner diameter of the adjusting channel (222) and larger than the inner diameter of the tapered segment (224). The biasing member (25) is mounted in the adjusting channel (222) and abuts against the sealing member (26) to push the sealing member (26) to close the tapered segment (224) of the adjusting channel (222). The adjusting bolt (28) is screwed into the adjusting channel (222) and abuts with the biasing member (25). The branch channel (226) is radially defined in the plug (22) and communicates with the adjusting channel (222).

With such a pressure-adjusting valve, when the oil pressure in the compressed segment is larger than the resilience of the biasing member (25), the seal member (26) will be pushed to leave from the tapered segment (224) to allow oil in the compressed segment to flow into the adjusting channel (222). Accordingly, the oil in the compressed segment will flow directly into the first flow channel between the plug (22) and the inner tube (10) through the adjusting channel (222) and the branch channel (226), and an adjusting effect is provided to the oil pressure in the compressed segment. When the bolt (28) is screwed relative to the plug (22), the tension provided by the biasing member (25) will be changed.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A shock absorber comprising:
    an outer tube having a closed end and an open end
    an inner tube slidably inserted into the open end of the outer tube and having an inner surface and an inner space with an inner diameter;
    a piston rod having a first end securely attached to the closed end of the outer tube and a second end extending into the inner tube;
    a piston securely mounted on the second end of the piston rod, slidably held inside the inner tube to divide the inner space of the inner tube into two segments and having at least one channel defined through the piston and communicating with the segments of the inner space of the inner tube; and
    a damping device comprising:
        a plug securely attached to the piston and having a diameter; and
        a sleeve securely mounted in the inner tube and having an inner diameter, wherein
    the diameter of the plug is smaller than the inner diameters of the inner space of the inner tube and the sleeve; and
    the inner diameter of the sleeve is smaller than that of the inner space of the inner tube,
    wherein the plug comprises a pressure-adjusting valve mounted in the plug and having an adjusting channel defined axially through the plug and having an inner diameter; and
    a tapered segment defined at an end of the adjusting channel opposite to the piston and having an inner diameter;
    a sealing member movably mounted in the adjusting channel to close the tapered segment of the adjusting channel and having a diameter smaller than the inner diameter of the adjusting channel and larger than the inner diameter of the tapered segment;
    a biasing member mounted in the adjusting channel and abutting against the sealing member to push the sealing member to close the tapered segment of the adjusting channel;
    an adjusting bolt screwed into the adjusting channel and abutting with the biasing member; and
    a branch channel radially defined in the plug and communicating with the adjusting channel.

2. The shock absorber as claimed in claim 1, wherein the inner tube has multiple annular positioning grooves separately defined in the inner surface of the inner tube, and
    the sleeve is securely mounted between two of the grooves in the inner tube with two fasteners mounted respectively in the grooves.

* * * * *